United States Patent
Zheng

(10) Patent No.: US 11,431,978 B2
(45) Date of Patent: Aug. 30, 2022

(54) VIDEO DECODING METHOD AND VIDEO DECODING DEVICE FOR IMPROVING DECODING EFFICIENCY

(71) Applicant: ALi Corporation, Hsinchu (TW)

(72) Inventor: Wen-Han Zheng, Guangdong (CN)

(73) Assignee: ALi Corporation, Hsinchu (TW)

( * ) Notice: Subject to any disclaimer, the term of this patent is extended or adjusted under 35 U.S.C. 154(b) by 0 days.

(21) Appl. No.: 17/073,407

(22) Filed: Oct. 19, 2020

(65) Prior Publication Data

US 2021/0195196 A1    Jun. 24, 2021

(30) Foreign Application Priority Data

Dec. 24, 2019  (CN) .................. 201911350921.X

(51) Int. Cl.
*H04N 19/13* (2014.01)
*H04N 19/176* (2014.01)
*H04N 19/70* (2014.01)

(52) U.S. Cl.
CPC ........... *H04N 19/13* (2014.11); *H04N 19/176* (2014.11); *H04N 19/70* (2014.11)

(58) Field of Classification Search
CPC ....... H04N 19/13; H04N 19/176; H04N 19/70
See application file for complete search history.

(56) References Cited

U.S. PATENT DOCUMENTS

| | | | | |
|---|---|---|---|---|
| 2007/0120711 | A1* | 5/2007 | Hu | H04N 19/91 341/50 |
| 2009/0096643 | A1* | 4/2009 | Chang | H04N 19/426 341/51 |
| 2013/0188699 | A1* | 7/2013 | Joshi | H04N 19/18 375/240.12 |
| 2013/0272378 | A1* | 10/2013 | Sole Rojals | H04N 19/167 375/240.02 |
| 2018/0091815 | A1* | 3/2018 | Banerjee | H04N 19/70 |

FOREIGN PATENT DOCUMENTS

| | | |
|---|---|---|
| CN | 102231830 | 4/2013 |
| CN | 103826120 | 4/2017 |

* cited by examiner

*Primary Examiner* — Zhubing Ren
(74) *Attorney, Agent, or Firm* — JCIPRNET

(57) ABSTRACT

A video decoding method and a video decoding device are provided, and the video decoding method includes the following steps. A to-be-decoded bin string is received. A plurality of first current syntax elements in the to-be-decoded bin string are decoded based on a first context model until a decoding output value of the last one of the first current syntax elements matches a specific bin pattern. When the first current syntax elements are decoded, in response to that a state machine is switched from a first decoding operation mode to a second decoding operation mode, a second current syntax element that exists based on the last one of the first current syntax elements is decoded.

10 Claims, 9 Drawing Sheets

| cycle period | CC1 | CC2 | CC3 | CC4 | CC5 | CC6 | CC7 | CC8 | CC9 | CC10 | CC11 | CC12 |
|---|---|---|---|---|---|---|---|---|---|---|---|---|
| syntax element buffer | writing in index values of CSFB | | | | writing in index values of CSFB | | | | writing in index value of SIG_COEF | | | |
| probability cache circuit | | writing first context model | | | | writing first context model | | | | writing second context model | | |
| binary arithmetic decoding circuit | | | decoding csbf_1 | | | | decoding csbf_2 | | | | decoding sig_coef_1 | |
| debinarization circuit | | | | determining true value of csbf_1 | | | | determining true value of csbf_2 | | | | determining true value of sig_coef_1 |

FIG. 4A
(Prior Art)

| cycle period | CC1 | CC2 | CC3 | CC4 | CC5 | CC6 | CC7 | CC8 | CC9 | CC10 | CC11 | CC12 |
|---|---|---|---|---|---|---|---|---|---|---|---|---|
| syntax element buffer | writing in index values of CSFB | writing in index value of SIG_COEF | | | | | | | | | | |
| probability cache circuit | | writing first context model | writing second context model | | | | | | | | | |
| binary arithmetic decoding circuit | | | decoding csbf_1 | decoding csbf_2 | decoding sig_coef_1 | | | | | | | |
| debinarization circuit | | | | | determining true values of csbf_1 and csbf_2 | determining true value of sig_coef_1 | | | | | | |

FIG. 4B

| cycle period | CC1 | CC2 | CC3 | CC4 | CC5 | CC6 | CC7 | CC8 | CC9 | CC10 | CC11 | CC12 | CC13 | CC14 | CC15 | CC16 |
|---|---|---|---|---|---|---|---|---|---|---|---|---|---|---|---|---|
| syntax element buffer | writing in index values of CSFB | | | | writing in index values of CSFB | | | | writing in index values of CSFB | | | | writing in index value of SIG_COEF | | | |
| probability cache circuit | | writing first context model | | | | writing first context model | | | | writing first context model | | | | writing second context model | | |
| binary arithmetic decoding circuit | | | decoding csbf_1 | | | | decoding csbf_2 | | | | decoding csbf_3 | | | | decoding sig_coef_1 | |
| debinarization circuit | | | | determining true value of csbf_1 | | | | determining true value of csbf_2 | | | | determining true value of csbf_3 | | | | determining true value of sig_coef_1 |

FIG. 5A
(Prior Art)

| cycle period | CC1 | CC2 | CC3 | CC4 | CC5 | CC6 | CC7 | CC8 | CC9 | CC10 | CC11 | CC12 |
|---|---|---|---|---|---|---|---|---|---|---|---|---|
| syntax element buffer | writing in index values of CSFB | writing in index value of SIG_COEF | | | | | | | | | | |
| probability cache circuit | | writing first context model | writing second context model | | | | | | | | | |
| binary arithmetic decoding circuit | | | decoding csbf_1 | decoding csbf_2 | decoding csbf_3 | decoding sig_coef_1 | | | | | | |
| debinarization circuit | | | | | | determining true values of csbf_1, csbf_2, and csbf_3 | determining true value of sig_coef_1 | | | | | |

FIG. 5B

VIDEO DECODING METHOD AND VIDEO DECODING DEVICE FOR IMPROVING DECODING EFFICIENCY

CROSS-REFERENCE TO RELATED APPLICATION

This application claims the priority benefit of Chinese patent application serial no. 201911350921.X, filed on Dec. 24, 2019. The entirety of the above-mentioned patent application is hereby incorporated by reference herein and made a part of this specification.

BACKGROUND

Technical Field

The disclosure relates to a decoding technology, and more particularly, relates to a video decoding method and a video decoding device.

Description of Related Art

With the development and spread of hardware capable of reproducing and storing high-resolution or high-definition video content, the demand for video codecs capable of effectively encoding or decoding high-resolution or high-definition video content is on the rise. In an effort to satisfy such demand, the Video Coding Experts Group (VCEG) of the International Telecommunication Union (ITU-T) joins hands with the Moving Picture Experts Group (MPEG) of the International Organization for Standardization (ISO/IEC) to develop the H.265/High Efficiency Video Coding (H.265/HEVC) project, with an aim to provide greater encoding efficiency than the encoding efficiency provided by the H.264/Advanced Video Coding (H.264/AVC) video compression standard.

In the H.265/HEVC video compression standard, an image is divided into blocks of a predetermined size, and residual data of the blocks is obtained through inter prediction or intra prediction. Residual data is compressed by transforming, quantizing, scanning, run-length encoding, and entropy encoding. In entropy coding, a syntax element of a transform coefficient or a prediction mode is entropy-encoded to output a bin string. The syntax element from the bin string is parsed and retrieved at the decoding end, and the bin string is decoded to reconstruct the image based on the retrieved syntax element (or called as a codeword). When H.265/HEVC is applied to decode a syntax element, the decoding end has to complete decoding of one syntax element before decoding the next syntax element. That is because the decoding end has to obtain the decoding result of the syntax element currently being decoded first, so as to learn how to decode the next syntax element.

For instance, referring to FIG. 1, FIG. 1 is a schematic diagram of a conventional decoding syntax element code_sub_block_flag (CSBF) and a syntax element sig_coeff_flag (SIG). According to the current H.265/HEVC specification, it can be known that if the decoding result of the syntax element CSBF1 is "0", the next to-be-decoded syntax element is CSBF2, and if the decoding result of the syntax element is CSBF1 is "1", the next to-be-decoded syntax element is SIG1. In other words, not until decoding of the syntax element CSBF1 is completed does decoding of one of the syntax element CSBF2 and the syntax element SIG1 begin. As such, decoding efficiency is limited and cannot be further improved.

SUMMARY

Accordingly, the disclosure provides a video decoding method and a video decoding device through which standby time required to decode a syntax element is reduced, so that decoding efficiency is improved.

An embodiment of the disclosure provides a video decoding method, and the method includes the following steps. A to-be-decoded bin string is received. A plurality of first current syntax elements in the to-be-decoded bin string are decoded based on a first context model until a decoding output value of the last one of the first current syntax elements matches a specific bin pattern. When the first current syntax elements are decoded, in response to that a state machine is switched from a first decoding operation mode to a second decoding operation mode, a second current syntax element that exists based on the last one of the first current syntax elements is decoded.

From another aspect, an embodiment of the disclosure provides a video decoding device including one circuit or a plurality of circuits. The circuit is configured to: receive a to-be-decoded bin string, decode a plurality of first current syntax elements in the to-be-decoded bin string based on a first context model until the last one of the first current syntax elements matches a specific bin pattern, and decode a second current syntax element that exists based on the last one of the first current syntax elements in response to that a state machine is switched from a first decoding operation mode to a second decoding operation mode when the first current syntax elements are decoded.

To sum up, in the embodiments of the disclosure, when decoding the plurality of first current syntax elements, the decoding device may decode the second current syntax element at the same time. Herein, the second current syntax element exists reflecting the decoding output value of the last one of the first current syntax elements matching the specific bin pattern. It thus can be seen that decoding of the first current syntax elements and decoding of the second current syntax element may be performed in parallel, idle time of a hardware circuit may be reduced and decoding efficiency is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4A is a schematic diagram of a conventional CABAC decoding process according to a pipeline structure.

FIG. 4B is a schematic diagram illustrating the CABAC decoding process according to the pipeline structure according to an embodiment of the disclosure.

FIG. 5A is a schematic diagram of a conventional CABAC decoding process according to a pipeline structure.

FIG. 5B is a schematic diagram illustrating the CABAC decoding process according to the pipeline structure according to an embodiment of the disclosure.

DESCRIPTION OF THE EMBODIMENTS

Figure 1:
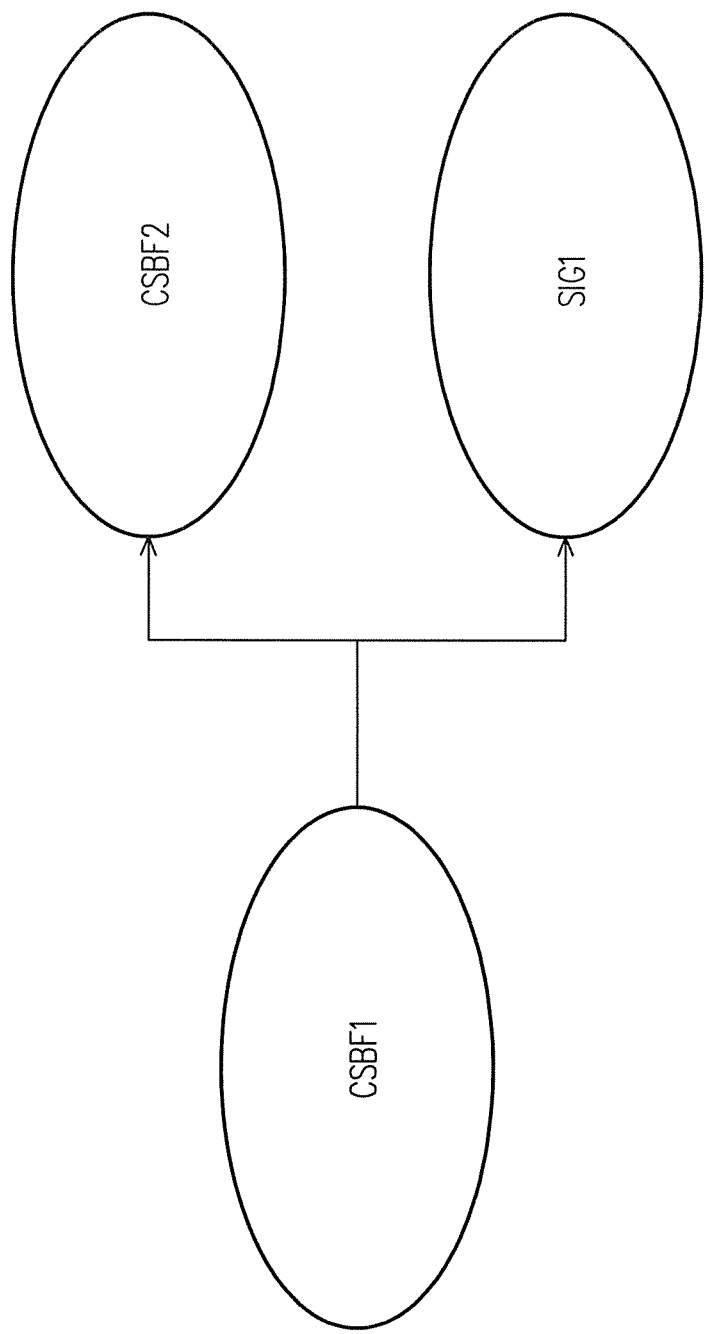
FIG. 1 is a schematic diagram of a conventional decoding syntax element code_sub_block_flag and a syntax element sig_coeff_flag.

Exemplary embodiments of the disclosure are explained in detail below with reference to the drawings. In addition, wherever possible, identical or similar reference numerals stand for identical or similar elements/components in the drawings and embodiments.

Figure 2:
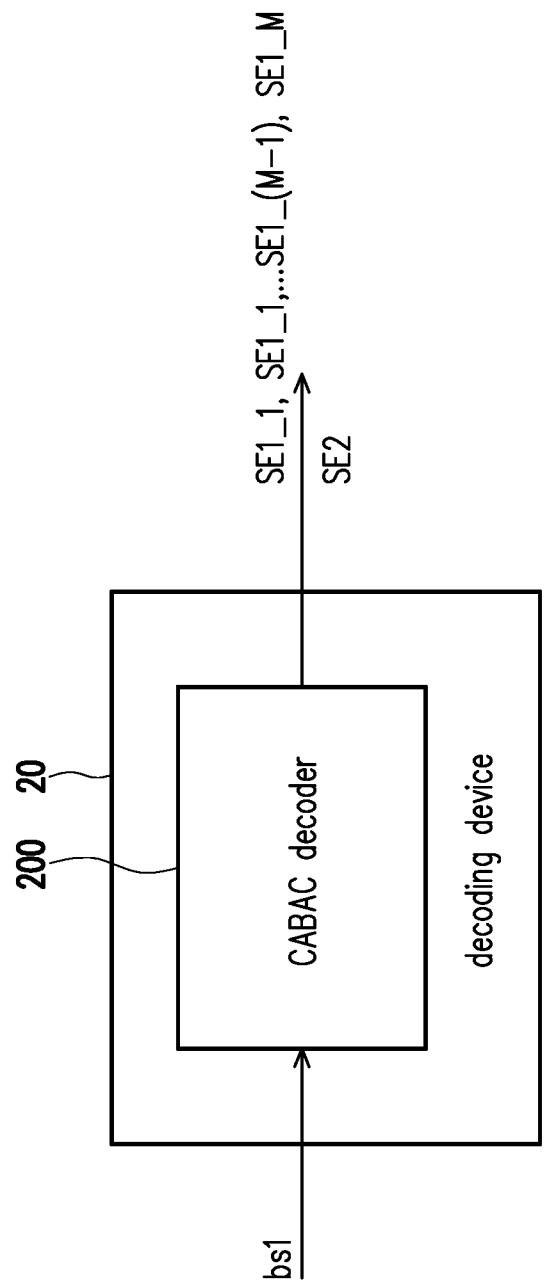
FIG. 2 is a schematic diagram illustrating a video decoding device according to an embodiment of the disclosure.

FIG. 2 is a schematic diagram illustrating a video decoding device according to an embodiment of the disclosure. With reference to FIG. 2, in the embodiments of the disclosure, a video decoding device 20 includes a context adaptive binary arithmetic coding (CABAC) decoder 200 capable of performing syntax element switching, probability updating, binary arithmetic decoding, and debinarization in sequence to decode a to-be-decoded bin string and to obtain a decoded syntax element. The CABAC decoder 200 may be implemented through a digital circuit and is integrated on an integrated circuit chip.

In an embodiment, the CABAC decoder 200 may receive a to-be-decoded bin string bs1 that includes a plurality of binarized bits known as 'bins'. Based on a first context model, the CABAC decoder 200 may decode M first current syntax elements binarized into bins in the to-be-decoded bin string bs1 to generate decoding output values SE1_1 to SE1_M, and not until one (e.g., SE1_M) of the decoding output values matches a specific bin pattern does the CABAC decoder 200 stop decoding the M first current syntax elements. To be specific, these first current syntax elements are encoded according to the same first context model. As such, the decoding output values SE1_1 to SE1_(M−1) of the first current syntax elements do not match the specific bin pattern, but the decoding output value SE1_M of the first current syntax element matches the specific bin pattern.

Note that the CABAC decoder 200 may decode the plurality of first current syntax elements together in one pipeline decoding period. A total length of the decoding output values SE1_1 to SE1_M of the first current syntax elements decoded in the pipeline decoding period is M bins, and M is an integer equal to or greater than 1. Therefore, one pipeline decoding period represents a complete period in which a plurality of decoding circuits in a pipeline structure sequentially execute different decoding tasks and finally generate a true value. The specific bin pattern is, for example, "1" in binary, but the specific bin pattern is not limited by the disclosure and may be designed based on actual needs. Note that when the decoding output value of one of the first current syntax elements, for example SE1_M, matches the specific bin pattern, it means that the to-be-decoded bin string bs1 includes a to-be-decoded binary bin string of a second current syntax element that exists reflecting the decoding output value SE1_M of the first current syntax element matching the specific bin pattern. Accordingly, the CABAC decoder 200 may decode the second current syntax element to obtain a decoding output value SE2 of the second current syntax element.

Note that when the plurality of first current syntax elements are decoded, the CABAC decoder 200 may prepare to decode the second current syntax element that exists based on the decoding output value of one of the first current syntax elements matching the specific bin pattern in response to that a state machine is switched from a first decoding operation mode to a second decoding operation mode. That is, when the CABAC decoder 200 decodes the plurality of first current syntax elements, the state machine inside the CABAC decoder 200 may be switched from the first decoding operation mode to the second decoding operation mode, so that a decoding operation of the first current syntax elements and a decoding operation of the second current syntax element may be executed together.

As such, when the state machine is in the first decoding operation mode, the state machine may write first index values corresponding to the first current syntax elements into a buffer circuit, so that the CABAC decoder 200 selects the first context model according to context information to decode the plurality of first current syntax elements to obtain decoding results SE1_1 to SE1_M. Specifically, the state machine may write the first index values into the buffer circuit, so that another circuit module in the CABAC decoder 200 may decode the plurality of first current syntax elements in response to the first index values in the buffer circuit, so as to obtain the decoding output values SE1_1 to SE1_M of the first current syntax elements. In addition, when the state machine is in the second decoding operation mode, the state machine may write a second index value corresponding to the second current syntax element into the buffer circuit, so that the CABAC decoder 200 goes on to select a second context model according to the context information to decode the second current syntax element SE2. For instance, after the state machine writes the second index value into the buffer circuit, when the decoding output value SE1_M of one of the first current syntax elements matches the specific bin pattern, the another circuit module in the CABAC decoder 200 may decode the second current syntax element in response to the second index value in the buffer circuit, so as to obtain the decoding output value SE2 of the second current syntax element.

In the conventional art, the CABAC decoder is required to decode the first current syntax elements one by one and accordingly determines whether to switch the decoding operation mode of the state machine. Nevertheless, in the embodiments of the disclosure, it can be seen that the decoding operation mode is switched by the state machine when the plurality of first current syntax elements are decoded. In this way, decoding of the first current syntax elements and decoding of the second current syntax element may be performed together, so that decoding efficiency is obviously improved.

In order to clearly describe the principle of the disclosure, in the following embodiments, the first current syntax elements are exemplified as being treated as syntax elements code_sub_block_flag (CSBF), and the second current syntax element is exemplified as being treated as a syntax element sig_coeff_flag (SIG) for description, but the disclosure is not limited thereto. As long as the decoding result of the first current syntax elements may be used to determine the existence of the second current syntax element, decoding may be performed according to the foregoing description without departing from the scope of the disclosure.

In addition, in the embodiments of the disclosure, when the decoding output values of the syntax elements code_sub_ block_flag are "1" in binary, it means that a current decoding sub-block has a residual (a non-zero coefficient). Therefore, a to-be-decoded binary bin string of the syntax element sig_coeff_flag exists only in a to-be-decoded bin string of the current decoding sub-block. In contrast, when the decoding output values of the syntax elements code_sub_block_flag are "0" in binary, it means that the current decoding sub-block does not have a residual. Therefore, the to-be-decoded binary bin string of the syntax element sig_coeff_flag does not exist in the to-be-decoded bin string of the current decoding sub-block.

Figure 3:
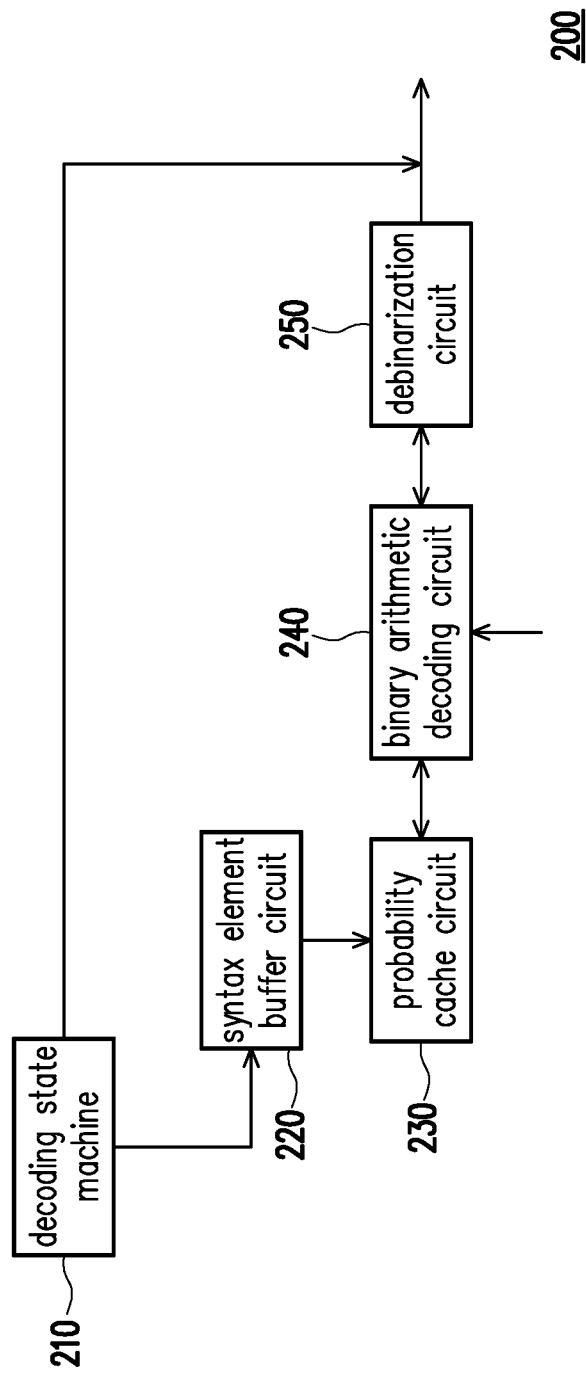
FIG. 3 is a flow chart of a video decoding method according to an embodiment of the disclosure.

FIG. 3 is a schematic diagram illustrating a video decoding device according to an embodiment of the disclosure. With reference to FIG. 3, the video decoding device 20 may include a plurality of circuit modules forming a pipeline processing structure, and these circuit modules are responsible for different decoding functions. Specifically, CABAC decoder 200 may include a decoding state machine 210 forming a pipeline structure, a syntax element buffer circuit 220, a probability cache circuit 230, a binary arithmetic decoding circuit 240, and a debinarization circuit 250.

The decoding state machine 210 determines a syntax element type of a current to-be-decoded syntax element according to a type and a determination result of a previously decoded syntax element, so as to write an index value corresponding to the current syntax element type into the syntax element buffer circuit 220 to further control a decoding operation of the rest of the circuit modules. The syntax element buffer circuit 220 is configured to store the index value indicating the type of the current to-be-decoded syntax element.

In this embodiment, the decoding state machine 210 writes index values corresponding to the syntax elements code_sub_block_flag into the syntax element buffer circuit 220 in a code_sub_block_flag mode after determining that the code_sub_block_flag mode is required to be switched to according to a switching condition (i.e., the syntax element type and the decoding result of the previous syntax element) of the previous syntax element. Next, the decoding state machine 210 may switch from the first decoding operation mode (i.e., the code_sub_block_flag mode) to the second decoding operation mode (i.e., the sig_coeff_flag mode) by itself in the next clock, so as to write the index value corresponding to the syntax element sig_coeff_flag in the syntax element buffer circuit 220. That is, in the embodiments of the disclosure, the decoding state machine 210 can switch from the first decoding operation mode to the second decoding operation mode without the need of other feedback information for determining the switching condition.

The probability cache circuit 230 is configured to implement the function of storing and updating a context model (also called as a probability model/probability table) according to the index values stored by the syntax element buffer circuit 220. For instance, when the syntax element buffer circuit 220 stores the index values of the syntax elements code_sub_block_flag, the probability cache circuit 230 may store the first context model suitable for the syntax elements code_sub_block_flag. When the syntax element buffer circuit 220 stores the index value of the syntax element sig_coeff_flag, the probability cache circuit 230 may store the second context model suitable for the syntax element sig_coeff_flag. Reference of the first context model configured to decode the syntax elements code_sub_block_flag and the second context model configured to decode the syntax element sig_coeff_flag may be found in the ITU-T H.265 specification.

The binary arithmetic decoding circuit 240 receives the to-be-decoded binary bin string of the syntax element in the to-be-decoded bin string and the context model in the probability cache circuit 230 and selects a corresponding decoding algorithm according to the corresponding syntax element, so as to decode the to-be-decoded binary bin string of the syntax element through the selected decoding algorithm and the context model thereof to output a decoded bin string.

The debinarization circuit 250 is configured to map the decoded bin string provided by the binary arithmetic decoding circuit 240 as a true value of the syntax element and accordingly provides the feedback information to the decoding state machine 210, so that the decoding state machine 210 may learn how to switch the decoding operation mode. Nevertheless, in the embodiments of the disclosure, when decoding the first current syntax elements and the second current syntax element (i.e., the syntax elements code_sub_block_flag and the syntax element sig_coeff_flag), the decoding state machine 210 may drive the probability cache circuit 230 to automatically obtain the first context model of the syntax elements code_sub_block_flag and the second context model of the syntax element sig_coeff_flag without requiring the debinarization circuit 250 to provide the feedback information to switch the decoding operation mode. Nevertheless, the feedback information provided by the debinarization circuit 250 may set the decoding state machine 210 to allow the binary arithmetic decoding circuit 240 to obtain the correct context model and the corresponding decoding algorithm from the probability cache circuit 230.

In an embodiment, when the syntax elements code_sub_block_flag are decoded, the CABAC decoder 200 stores the second context model into the probability cache circuit 230 in response to that the decoding state machine 210 switches the decoding operation modes. Therefore, when the decoding result of the syntax elements code_sub_block_flag reflects that the syntax element sig_coeff_flag exists, the binary arithmetic decoding circuit 240 may decode the syntax element sig_coeff_flag according to the second context model in the probability cache circuit 230. It thus can be seen that decoding of the plurality of syntax elements code_sub_block_flag and decoding of the syntax element sig_coeff_flag may be performed in a parallel manner.

Specifically, the binary arithmetic decoding circuit 240 may decode one of the syntax elements code_sub_block_flag in the to-be-decoded bin string bs1 according to the first context model and determines whether the decoding output value of one of the decoded syntax elements code_sub_block_flag matches the specific bin pattern. In other words, the binary arithmetic decoding circuit 240 sequentially decodes the plurality of syntax elements code_sub_block_flag and sequentially determines that whether the decoding result matches the specific bin pattern. If the decoding output value of one of the decoded syntax elements code_sub_block_flag does not match the specific bin pattern (i.e., is not "1" in binary), the decoding output value of one of the syntax elements code_sub_block_flag is recorded in a register of the binary arithmetic decoding circuit 240, and the next to-be-decoded binary bin string continues to be decoded, that is, the syntax elements code_sub_block_flag. From another perspective, if the decoding output value of one of the decoded syntax elements code_sub_block_flag matches the specific bin pattern (i.e., is "1" in binary), the binary arithmetic decoding circuit 240 combines the decoding output values of the syntax elements code_sub_block_flag in the register to generate a self-defining bin string, and debinarization is performed to the self-defining bin string through the debinarization circuit 250.

FIG. 4A is a schematic diagram of a conventional CABAC decoding process according to a pipeline structure. FIG. 4B is a schematic diagram illustrating the CABAC decoding process according to the pipeline structure according to an embodiment of the disclosure. With reference to FIG. 4A and FIG. 4B, it is assumed that the video decoding device 20 sequentially decodes two syntax elements code_sub_block_flag: csbf_1 and csbf_2 in the to-be-decoded bin string bs1, and it is assumed that the corresponding decoding output values thereof respectively are csbf_1="0" and csbf_2="1".

In a conventional manner, with reference to FIG. 4A, the decoding state machine 210 enters the code_sub_block_flag mode and controls the syntax element buffer circuit 220 to write in the index values corresponding to the syntax elements code_sub_block_flag in a cycle period CC1. The probability cache circuit 230 writes the first context model responding to the index values corresponding to the syntax elements code_sub_block_flag in a cycle period CC2. Next, the binary arithmetic decoding circuit 240 decodes the to-be-decoded binary bin string of the csbf_1 in a cycle period CC3. The debinarization circuit 250 determines that the decoding output value of the csbf_1 is "0" and provides the feedback information to the decoding state machine 210 in a cycle period CC4. As such, since the decoding state machine 210 learns that the csbf_1="0", the decoding state machine 210 enters the code_sub_block_flag mode again and controls the syntax element buffer circuit 230 to write in the index values corresponding to the syntax elements code_sub_block_flag in a cycle period CC5. The probability cache circuit 230 writes the first context model responding to the index values corresponding to the syntax elements code_sub_block_flag in a cycle period CC6. Next, the binary arithmetic decoding circuit 240 decodes the to-be-decoded binary bin string of the csbf_2 in a cycle period CC7. The debinarization circuit 250 determines that the decoding output value of the csbf_2 is "1" and provides the feedback information to the decoding state machine 210 in a cycle period CC8. Accordingly, since the decoding state machine 210 learns that csbf_2="1", which matches the specific bin pattern, the syntax element buffer circuit 220 writes in the index value corresponding to the syntax element sig_coeff_flag in a cycle period CC9, and the probability cache circuit 230 writes the second context model responding to the index value of the syntax element sig_coeff_flag in a cycle period CC10. Next, the binary arithmetic decoding circuit 240 decodes the to-be-decoded binary bin string of the sig_coef_1 according to the second context model in a cycle period CC11. The debinarization circuit 250 determines the decoding output value of the sig_coef_1 in a cycle period CC12. It thus can be seen that when csbf_1="0" and csbf_2="1", 12 cycle periods are needed to allow the csbf_1, csbf_2, and sig_coef_1 to be decoded in the conventional art.

On the contrary, with reference to FIG. 4B, in the embodiments of the disclosure, the decoding state machine 210 enters the code_sub_block_flag mode first and controls the syntax element buffer circuit 220 to write in the index values corresponding to the syntax elements code_sub_block_flag in the cycle period CC1. The probability cache circuit 230 writes the first context model responding to the index values corresponding to the syntax elements code_sub_block_flag stored by the syntax element buffer circuit 220 in the cycle period CC2. Next, the binary arithmetic decoding circuit 240 decodes the to-be-decoded binary bin string of the csbf_1 according to the first context model stored by the probability cache circuit 230 in the cycle period CC3. During this period, after the decoding state machine 210 controls the syntax element buffer circuit 220 to write in the index values of the syntax elements code_sub_block_flag in the cycle period CC1, that is, the code_sub_block_flag mode is automatically switched to the sig_coeff_flag mode, the decoding state machine 210 further controls the syntax element buffer circuit 220 to write in the index value corresponding to the syntax element sig_coeff_flag in the cycle period CC2. Therefore, after writing the first context model in the cycle period CC2, the probability cache circuit 230 may further write the second context model in the cycle period CC3 responding to the index value corresponding to the syntax element sig_coeff_flag stored by the syntax element buffer circuit 220 in the cycle period CC2.

Referring back to the decoding of csbf_1, the binary arithmetic decoding circuit 240 decodes the csbf_1, obtains the decoding output value of "0" of the csbf_1, and determines that the decoding output value of the csbf_1 does not match the specific bin pattern in the cycle period CC3. Therefore, after probability is updated in the cycle period CC4, the binary arithmetic decoding circuit 240 continues to decode the next to-be-decoded binary bin string in the to-be-decoded bin string bs1 according to the first context model, that is, the syntax element csbf_2. When decoding the csbf_2 and obtaining the decoding output value of "1" of the csbf_2, the binary arithmetic decoding circuit 240 determines that the decoding output value matches the specific bin pattern in the cycle period CC4. That is, in the to-be-decoded bin string bs1, the to-be-decoded binary bin string of the syntax element sig_coeff_flag, that is, the sig_coef_1, exists after the syntax element csbf_2. After the binary arithmetic decoding circuit 240 feeds back the result of the decoding output value matching the specific bin pattern to the decoding state machine 210, the decoding state machine 210 may control the binary arithmetic decoding circuit 240 to read the second context model in the probability cache circuit 230 instead. Therefore, in the cycle period CC5, the binary arithmetic decoding circuit 240 decodes the next syntax element sig_coef_1 of the csbf_2 in the to-be-decoded bin string bs1 according to the second context model. At the same time, in the cycle period CC5, the debinarization circuit 250 performs debinarization to the self-defining bin strings generated by the binary arithmetic decoding circuit 240 when decoding the csbf_1 and csbf_2, so that true values are generated. In the cycle period CC6, the debinarization circuit 250 may debinarize the result of decoding the sig_coef_1 by the binary arithmetic decoding circuit 240 to be a true value. It thus can be seen that compared to the convention art through which 12 cycle periods are needed to complete decoding of the csbf_1, csbf_2, and sig_coef_1, the embodiments of the disclosure need only 6 cycle periods to complete decoding of the csbf_1, csbf_2, and sig_coef_1.

Nevertheless, note that the decoding output values of the syntax elements code_sub_block_flag are determined according to original image data, and the condition of csbf_1="0" and csbf_2="1" is exemplary only. Another example is provided in the following for description.

FIG. 5A is a schematic diagram of a conventional CABAC decoding process according to a pipeline structure. FIG. 5B is a schematic diagram illustrating the CABAC decoding process according to the pipeline structure according to an embodiment of the disclosure. With reference to FIG. 5A and FIG. 5B, it is assumed that the video decoding device 20 decodes three syntax elements code_sub_block_flag: csbf_1, csbf_2, and csbf_3, and the corresponding decoding output values thereof respectively are csbf_1="0", csbf_2="0", and csbf_3="1". Since the decoding output value of the csbf_3 is "1", the next syntax element of the csbf_3 is sig_coeff_flag, which is assumed to be sig_coef_1.

In the conventional art, referring to the description of FIG. 4A and FIG. 5A, it can be seen that when csbf_1="0", csbf_2="0", and csbf_3="1", it takes 16 cycle periods to complete decoding of the csbf_1, csbf_2, csbf_3, and sig_coef_1 in the conventional art.

On the contrary, with reference to FIG. 5B, in the embodiments of the disclosure, the syntax element buffer circuit 220 writes in the index values corresponding to the syntax elements code_sub_block_flag in the cycle period CC1. The probability cache circuit 230 writes the first context model responding to the index values buffered by the syntax element buffer circuit 220 in the cycle period CC2. Next, the binary arithmetic decoding circuit 240 decodes the to-be-decoded binary bin strings of the csbf_1, csbf_2, and csbf_3 in the cycle period CC3 to the cycle period CC5. The debinarization circuit 250 debinarizes the decoding output values of the csbf_1, csbf_2, and csbf_3 to be true values in the cycle period CC6. Note that if the hardware capability of the binary arithmetic decoding circuit 240 may be upgraded to be able to decode two or more syntax elements in one cycle period, the binary arithmetic decoding circuit 240 may need only 2 cycle periods (CC3 and CC4) or less to complete decoding of the csbf_1, csbf_2, and csbf_3. Nevertheless, the invention is not limited thereto.

Note that the syntax element buffer circuit 220 stores the index value corresponding to the syntax element sig_coef_flag in the cycle period CC2 according to control performed by the decoding state machine 210. The probability cache circuit 230 writes the second context model responding to the index value corresponding to the sig_coef_flag in the cycle period CC3. In this example, since the binary arithmetic decoding circuit 240 needs the periods of the cycle periods CC3 to CC5 to complete decoding of the csbf_1, csbf_2, and csbf_3, the binary arithmetic decoding circuit 240 decodes the to-be-decoded binary bin string of the sig_coef_1 in the cycle period CC6, and the debinarization circuit 250 debinarizes the decoding results of the csbf_1, csbf_2, and csbf_3 to be true values in the cycle period CC6 and debinarizes the decoding result of the sig_coef_1 to be a true value in the cycle period CC7. It thus can be seen that compared to the convention art through which 16 cycle periods are needed to complete decoding of the csbf_1, csbf_2, and sig_coef_1, the embodiments of the disclosure need only 7 cycle periods or less to complete decoding of the csbf_1, csbf_2, csbf_3, and sig_coef_1.

To be specific, with reference to FIG. 4B and FIG. 5B, it can be known that in the case that the decoding output values of the syntax elements code_sub_block_flag are continuously "0", the decoding state machine 210 may not need to switch states multiple times. The syntax element buffer circuit 220 may write in the same index values corresponding to the plurality of syntax elements code_sub_block_flag at one time in one cycle instead of separately writing in the index values of the plurality of syntax elements code_sub_block_flag in several cycle periods. Accordingly, the probability cache circuit 230 does not need to repeatedly write the first context model in multiple cycle periods, either. The number of the cycle periods required by the binary arithmetic decoding circuit 240 to decode the to-be-decoded binary bin strings of the plurality of syntax elements code_sub_block_flag may also be decreased.

Figure 6:
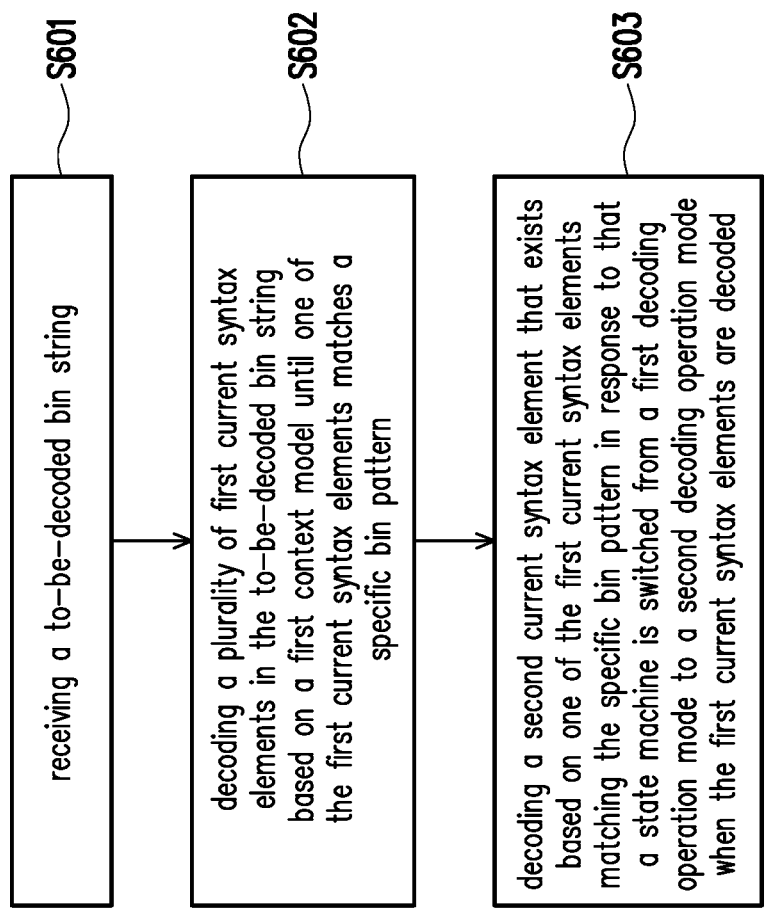
FIG. 6 is a flow chart of a video decoding method according to an embodiment of the disclosure.

FIG. 6 is a flow chart of a video decoding method according to an embodiment of the disclosure. Sufficient teachings, suggestions, and implementation description related to implementation details and device features of the video decoding method of this embodiment may be acquired with reference to the description of the embodiments of FIG. 1 to FIG. 5, and that repeated description is not provided hereinafter.

In step S601, a to-be-decoded bin string is received. In step S602, a plurality of first current syntax elements in the to-be-decoded bin string are decoded based on a first context model until a decoding output value of one of the first current syntax elements matches a specific bin pattern. In step S603, a second current syntax element that exists based on the decoding output value of one of the first current syntax elements matching the specific bin pattern is decoded in response to that a state machine is switched from a first decoding operation mode to a second decoding operation mode when the first current syntax elements are decoded. Herein, time for executing step S602 overlaps time for executing step S603.

Figure 7:
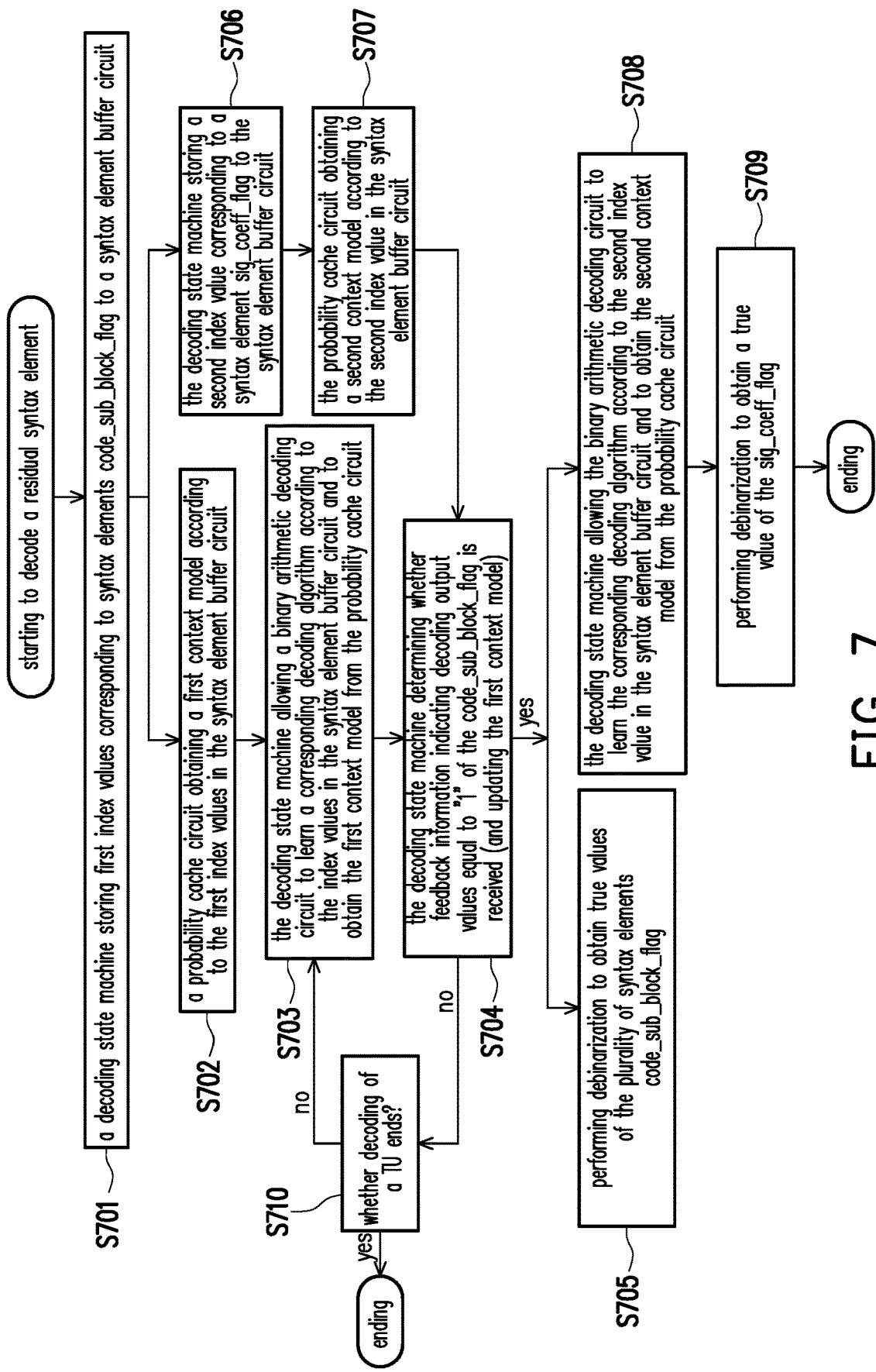
FIG. 7 is a flow chart of a video decoding method according to an embodiment of the disclosure.

FIG. 7 is a flow chart of a video decoding method according to an embodiment of the disclosure. Sufficient teachings, suggestions, and implementation description related to implementation details and device features of the video decoding method of this embodiment may be acquired with reference to the description of the embodiments of FIG. 1 to FIG. 5, and that repeated description is not provided hereinafter.

In step S701, a decoding state machine stores first index values corresponding to the syntax elements code_sub_block_flag to a syntax element buffer circuit. In step S702, a probability cache circuit obtains a first context model according to the first index values in the syntax element buffer circuit. For instance, as the first index values correspond to the syntax elements code_sub_block_flag, the first context model includes a probability table suitable for the syntax elements code_sub_block_flag. In step S703, the decoding state machine allows a binary arithmetic decoding circuit to learn a corresponding decoding algorithm according to the index values in the syntax element buffer circuit and to obtain the first context model from the probability cache circuit, so as to decode to-be-decoded binary bin strings of the plurality of code_sub_block_flag in a to-be-decoded bin string. In step S704, the decoding state machine determines whether feedback information indicating decoding output values equal to "1" of the code_sub_block_flag is received. In addition, when the to-be-decoded binary bin strings of the plurality of code_sub_block_flag are decoded, the decoding state machine updates probability in the first context model. If no is determined in step S704, it is determined that whether decoding of a transform unit (TU) ends in step S710. If no is determined in step S710, step S703 is performed again.

In contrast, in step S706, the decoding state machine may store a second index value corresponding to the syntax element sig_coeff_flag to the syntax element buffer circuit after step S701. In step S707, the probability cache circuit obtains a second context model according to the second index value in the syntax element buffer circuit to prepare to perform decoding of the syntax element sig_coeff_flag. Note that step S707 is performed later than step S702.

Therefore, if yes is determined in step S704 (that is, the decoding output values of the syntax elements code_sub_block_flag are "1"), a debinarization circuit performs debinarization to obtain true values of the plurality of syntax elements code_sub_block_flag in step S705. Moreover, in step S708, the decoding state machine allows the binary arithmetic decoding circuit to learn the corresponding decoding algorithm according to the second index value in the syntax element buffer circuit and to obtain the second context model from the probability cache circuit, so as to decode a to-be-decoded binary bin string of the one syntax element sig_coeff_flag in the to-be-decoded bin string. In step S709, the debinarization circuit performs debinarization to obtain a true value of the syntax element sig_coeff_flag.

In view of the foregoing, in the embodiments of the disclosure, in the case that the second current syntax element exists in response to that the decoding output values of the first current syntax elements matching the specific bin pattern, the decoding device may decode the plurality of first current syntax elements and the corresponding second current syntax element in parallel. Accordingly, the number of cycle periods required for decoding the plurality of first current syntax elements is significantly decreased, and thus, decoding of the second current syntax element may be performed earlier. Therefore, idle time of the hardware circuit in the pipeline structure is reduced, and decoding efficiency is considerably improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A video decoding method, wherein the video decoding method comprises:
    receiving a to-be-decoded bin string;
    decoding a plurality of first current syntax elements in the to-be-decoded bin string based on a first context model until a decoding output value of one of the plurality of first current syntax elements matches a specific bin pattern; and
    decoding a second current syntax element that exists based on the decoding output value of one of the plurality of first current syntax elements matching the specific bin pattern in response to that a state machine is switched from a first decoding operation mode to a second decoding operation mode during a decoding period of the plurality of first current syntax elements,
    wherein the first decoding operation mode for decoding the plurality of first current syntax elements and the second decoding operation mode for decoding the second current syntax element are performed in parallel during the decoding period of the plurality of first current syntax elements,
    wherein the step of decoding the plurality of first current syntax elements in the to-be-decoded bin string based on the first context model until one of the plurality of first current syntax elements matches the specific bin pattern comprises:
        determining whether the decoding output value of one of the plurality of first current syntax elements matches the specific bin pattern;
        storing the decoding output value of one of the plurality of first current syntax elements in a register only when the decoding output value of one of the plurality of first current syntax elements does not match the specific bin pattern; and
        in response to the decoding output value of one of the plurality of first current syntax elements matches the specific bin pattern, generating a self-defining bin string by combining decoding output values which are already stored in the register and are not matched with the specific bin pattern.

2. The video decoding method as claimed in claim 1, wherein the plurality of first current syntax elements comprise code_sub_block_flag, the second current syntax element comprises sig_coeff_flag, and the specific bin pattern is "1" in binary.

3. The video decoding method as claimed in claim 2, wherein a total length of the decoding output values of the plurality of first current syntax elements is M bins, and M is an integer equal to or greater than 1.

4. The video decoding method as claimed in claim 1, wherein the step of decoding the second current syntax element that exists based on the decoding output value of one of the plurality of first current syntax elements matching the specific bin pattern in response to that the state machine is switched from the first decoding operation mode to the second decoding operation mode during the decoding period of the plurality of first current syntax elements further comprises:
    storing a second context model into a cache circuit responding to a second index value configured by the state machine in response to the state machine switching decoding operation modes when the plurality of first current syntax elements are decoded; and
    decoding the second current syntax element that exists based on the decoding output value of one of the plurality of first current syntax elements matching the specific bin pattern according to the second context model.

5. The video decoding method as claimed in claim 1, wherein the step of decoding the plurality of first current syntax elements in the to-be-decoded bin string based on the first context model until one of the plurality of first current syntax elements matches the specific bin pattern further comprises:
    storing the first context model into a cache circuit in response to a first index value configured by the state machine;
    decoding one of the plurality of first current syntax elements in the to-be-decoded bin string based on the first context model; and
    performing debinarization to the self-defining bin string after generating the self-defining bin string.

6. A video decoding device, wherein the video decoding device comprises a circuit or a plurality of circuits, and the circuit is configured to:
    receive a to-be-decoded bin string,
    decode a plurality of first current syntax elements in the to-be-decoded bin string based on a first context model until a decoding output value of one of the plurality of first current syntax elements matches a specific bin pattern, and
    decode a second current syntax element that exists based on the decoding output value of one of the plurality of first current syntax elements matching the specific bin pattern in response to that a decoding state machine is switched from a first decoding operation mode to a second decoding operation mode during a decoding period of the plurality of first current syntax elements,
    wherein the first decoding operation mode for decoding the plurality of first current syntax elements and the second decoding operation mode for decoding the second current syntax element are performed in parallel during the decoding period of the plurality of first current syntax elements,
    wherein the decoding state machine determines whether the decoding output value of one of the plurality of first current syntax elements matches the specific bin pattern, wherein only when the decoding output value of one of the plurality of first current syntax elements does not match the specific bin pattern, a storing operation is performed to store the decoding output value of one of the plurality of first current syntax elements in a register, wherein in response to the decoding output value of one of the plurality of first current syntax elements matches the specific bin pattern, a self-defining bin string is generated by combining decoding output values which are not matched with the specific bin pattern and are already stored in the register.

7. The video decoding device as claimed in claim 6, wherein the plurality of first current syntax elements comprise code_sub_block_flag, the second current syntax element comprises sig_coeff_flag, and the specific bin pattern of the decoding output values of the code_sub_block_flag is "1" in binary.

8. The video decoding device as claimed in claim 7, wherein a total length of the decoding output values of the plurality of first current syntax elements is M bins, and M is an integer equal to or greater than 1.

9. The video decoding device as claimed in claim 6, wherein the video decoding device comprises:

the decoding state machine, entering the first decoding operation mode according to the plurality of first current syntax elements in the to-be-decoded bin string;

a syntax element buffer circuit, entering the first decoding operation mode in response to the decoding state machine and buffering a first index value corresponding to the plurality of first current syntax elements;

a probability cache circuit, storing the first context model responding to the first index value;

a binary arithmetic decoding circuit, decoding one of the plurality of first current syntax elements in the to-be-decoded bin string based on the first index value and the first context model and generating a decoding output value to be recorded in the register; and a debinarization circuit, receiving the decoding output value generated by decoding performed by the binary arithmetic decoding circuit and performing debinarization to the self-defining bin string.

10. The video decoding device as claimed in claim 9, wherein the decoding state machine is switched from the first decoding operation mode to the second decoding operation mode after the syntax element buffer circuit buffers the first index value, controls the syntax element buffer circuit to buffer a second index value corresponding to the second current syntax element, and controls the probability cache circuit to store second context model responding to the second index value, wherein the decoding state machine controls the binary arithmetic decoding circuit to decode the second current syntax element that exists based on the decoding output value of one of the plurality of first current syntax elements matching the specific bin pattern according to the second index value and the second context model when determining that the decoding output value of one of the plurality of first current syntax elements matches the specific bin pattern.

* * * * *